United States Patent [19]

Dunn et al.

[11] Patent Number: 5,636,548

[45] Date of Patent: Jun. 10, 1997

[54] ANALOG HALL-EFFECT LIQUID LEVEL DETECTOR AND METHOD

[75] Inventors: William D. Dunn, San Antonio; Lonnie G. Traylor, Pleasanton, both of Tex.

[73] Assignee: Tesoro Alaska Petroleum Company, San Antonio, Tex.

[21] Appl. No.: 245,142

[22] Filed: May 16, 1994

[51] Int. Cl.$^6$ .................................................. G01F 23/68
[52] U.S. Cl. ................................................ 73/313; 73/1.73
[58] Field of Search ............................... 73/313, DIG. 5, 73/1 H; 324/204, 251

[56] References Cited

U.S. PATENT DOCUMENTS

| | | | |
|---|---|---|---|
| 4,014,015 | 3/1977 | Gundlach | 73/290 R X |
| 4,125,022 | 11/1978 | Sumida | 73/313 |
| 4,361,835 | 11/1982 | Nagy | 340/624 |
| 4,466,284 | 8/1984 | Dumery | 73/313 |
| 4,589,282 | 5/1986 | Dumery | 73/313 |
| 5,016,198 | 5/1991 | Schreiber | 364/550 |
| 5,156,048 | 10/1992 | DeFigueiredo | 73/308 |

FOREIGN PATENT DOCUMENTS

| | | | |
|---|---|---|---|
| 267110 | 3/1971 | U.S.S.R. | 73/313 |

*Primary Examiner*—William A. Cuchlinski, Jr.
*Assistant Examiner*—Willie Morris Worth
*Attorney, Agent, or Firm*—Antonelli, Terry, Stout & Kraus, LLP

[57] ABSTRACT

A method and apparatus for measuring a liquid level by a float carrying one or more magnets and movably positioned adjacent spaced analog output voltage Hall-effect sensors. The apparatus is calibrated by moving the float relative to the sensors and measuring the voltage outputs of the sensors relative to the position of the float, and storing the measured values. After calibrating, the voltage outputs of any sensors activated by the presence of the float are measured and compared to the stored values to determine the liquid level. Preferably, the voltage output of at least two sensors are measured while the float is at one position for greater accuracy.

10 Claims, 8 Drawing Sheets

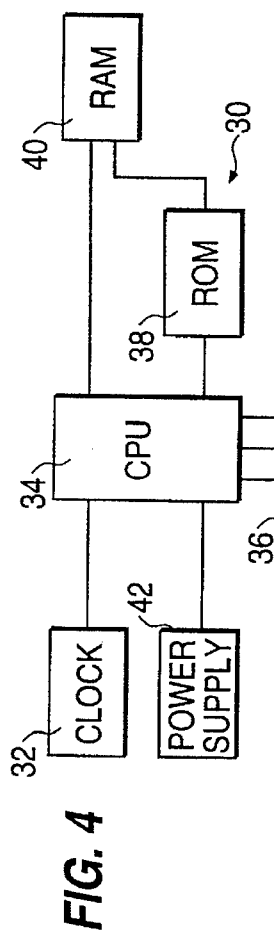
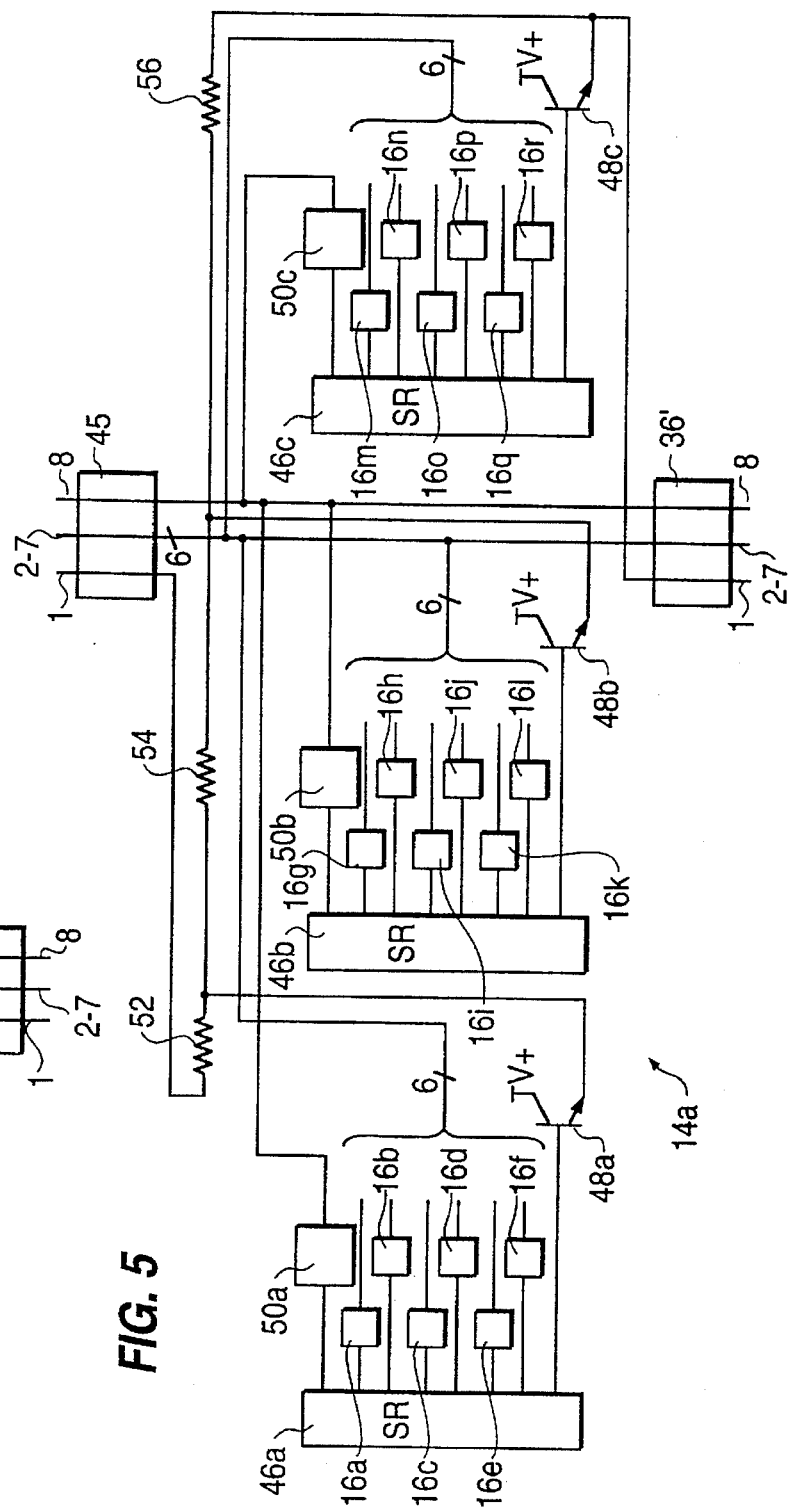
FIG. 4
FIG. 5

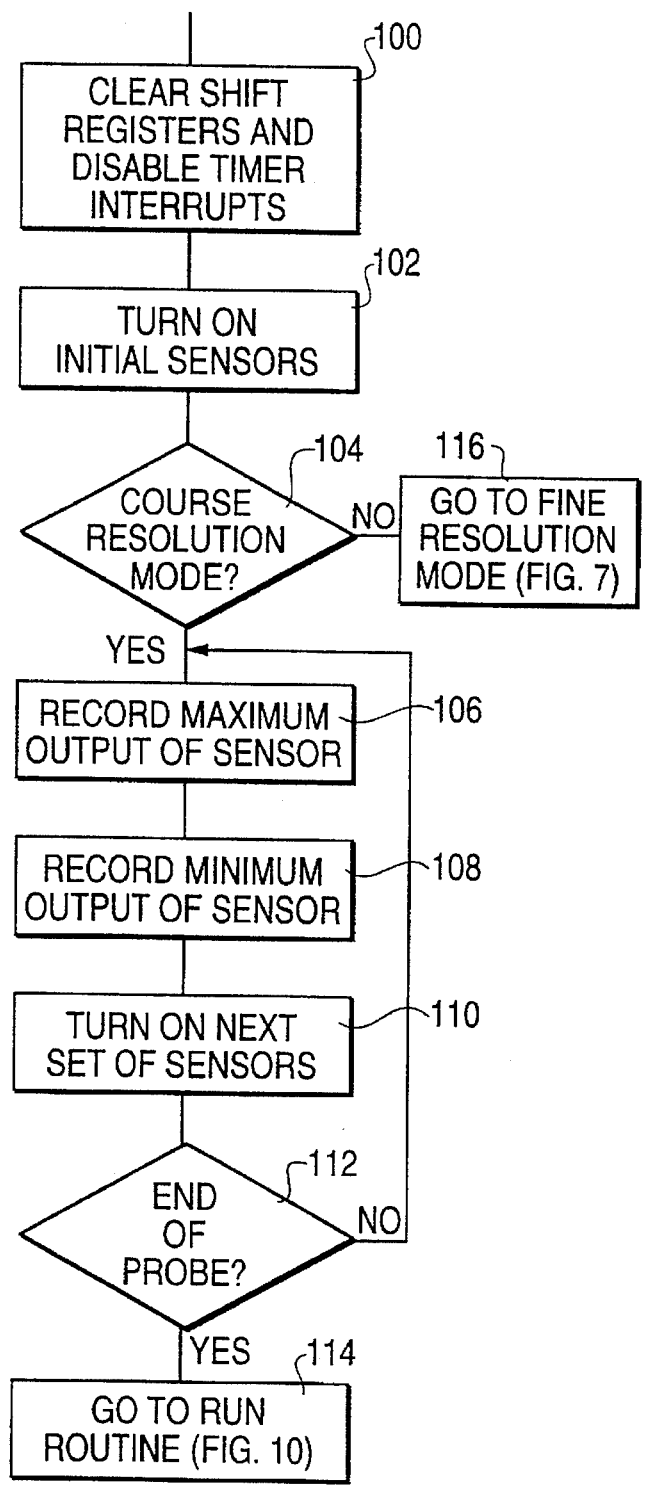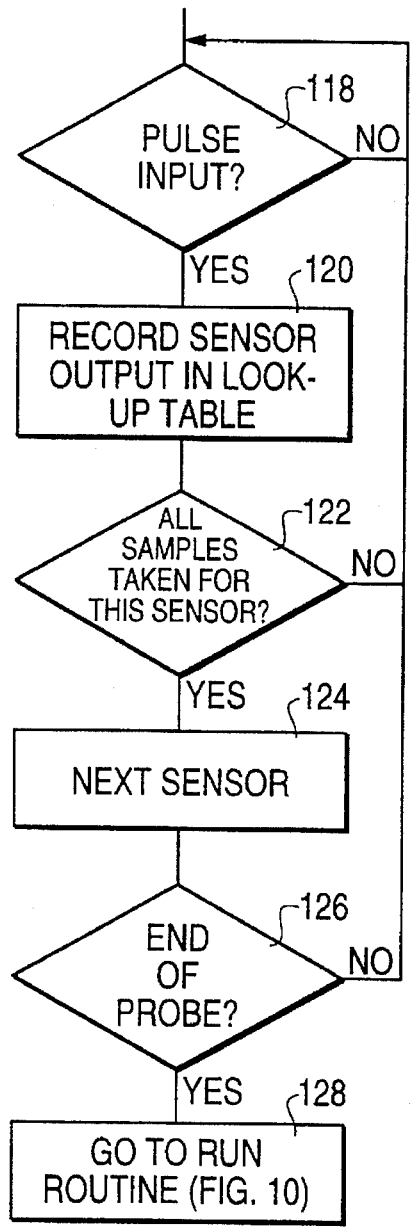

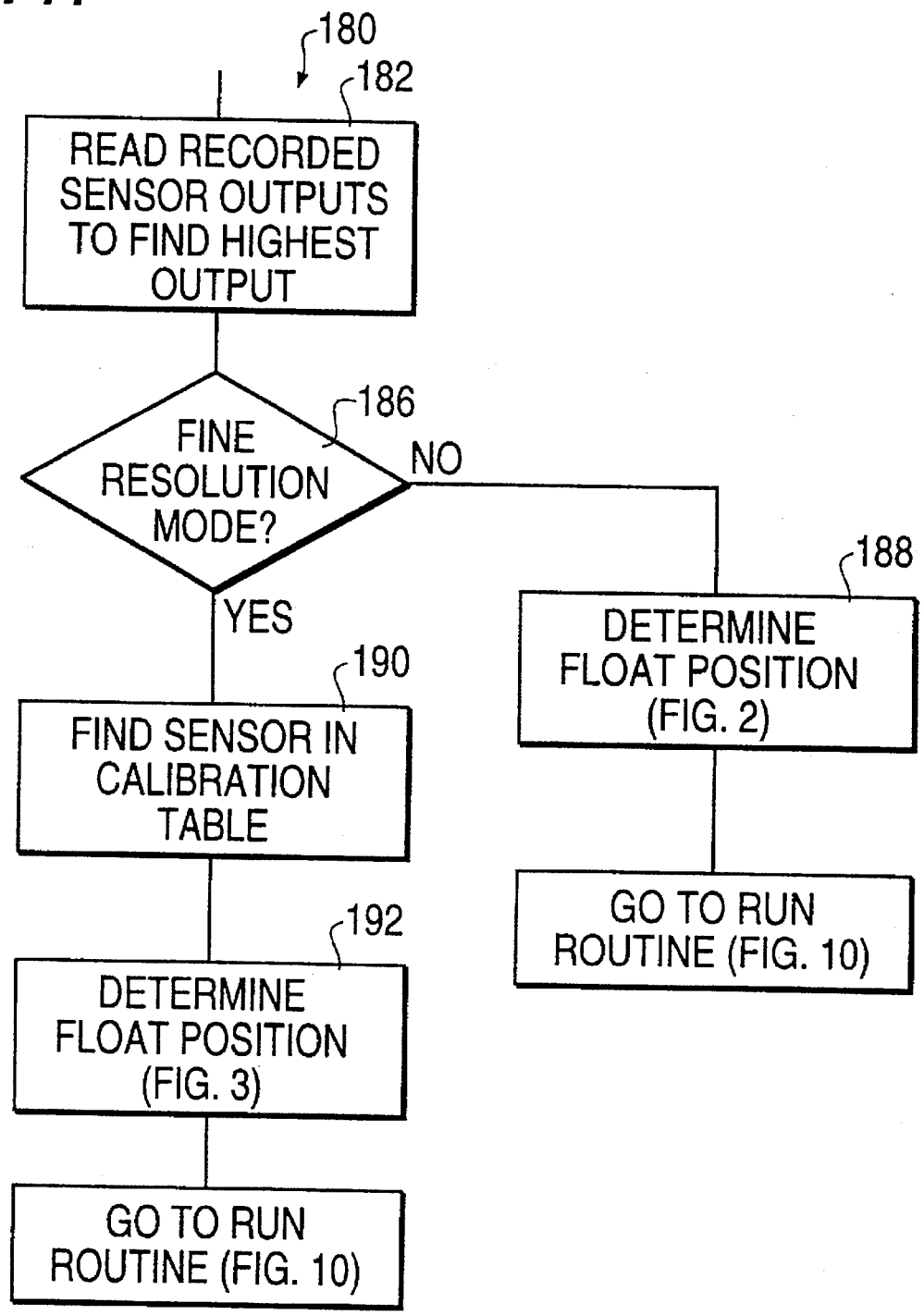

5,636,548

ANALOG HALL-EFFECT LIQUID LEVEL DETECTOR AND METHOD

BACKGROUND OF THE INVENTION

The present invention is directed to a liquid level measuring apparatus having a fixed array of spaced analog Hall-effect sensors actuated by a float which carries magnetic means, in which apparatus the variable output of the sensors provides a measurement of the position of the float and thus of the liquid level.

Digital Hall-effect sensors have been used, as disclosed in U.S. Pat. Nos. 4,361,835 and 4,589,282, for measuring liquid levels. The level accuracy in the '835 patent is directly related to the number of sensors. The '282 patent increased the accuracy of the digital sensors by the use of a complex compound magnetic float.

The present liquid level measuring apparatus and method use a plurality of spaced analog output voltage Hall-effect sensors, generally known as linear output Hall-effect sensors, in which the variable output of a sensor is a measurement of the position of the magnetic float relative to the sensor, and thus is a measurement of the liquid level. This provides a liquid level measurement with an accuracy greater than that obtained by the fixed spacing of the Hall-effect sensors. However, the voltage output of each analog Hall-effect sensor of a similar type varies due to manufacturing differences. The present invention overcomes this problem by calibrating the array of analog Hall-effect sensors relative to the position of the magnetic float, storing the calibrated values, during operation measuring the voltage outputs of any sensors activated by the presence of the magnetic float, and thereafter determining the location of the float by comparing the measured outputs with the stored values.

SUMMARY

The present invention is directed to a liquid level measuring apparatus having a plurality of spaced analog voltage Hall-effect sensors vertically aligned for positioning in a liquid, in which the sensors may have different voltage output characteristics, and a float carrying magnetic means and movably positioned adjacent the plurality of sensors. Storage means are provided for storing calibration values of the voltage outputs of each of the sensors relative to the position of the magnetic means, and measuring means are connected to the sensors for measuring the voltage outputs of any sensors activated by the presence of the magnetic means. Calculating means are provided for determining the location of the float by comparing the voltage outputs measured by the measuring means and the calibration values stored in the storage means.

Still a further object of the present invention is to provide such an apparatus wherein the memory means digitally stores the voltage outputs of at least two of the sensors as measured by the measuring means while the float is at one position.

Still a further object of the present invention is to provide such an apparatus wherein the stored values are more numerous than the number of sensors, thereby providing greater accuracy.

Yet a still further object of the present invention is the provision of temperature measuring means for measuring the temperature adjacent the sensors for use in compensating the output voltages of the sensors for temperature variation.

Still a further object of the present invention is the provision of means for sequentially measuring the voltage outputs of groups of sensors instead of individual sensors, thereby reducing the electrical current requirement.

Still a further object of the present invention is the provision of a method of measuring liquid level by a float carrying magnetic means movably positioned adjacent a plurality of spaced analog output voltage Hall-effect sensors positioned in the liquid, in which the sensors have different voltage output characteristics, which method includes calibrating the float and sensors by moving the float relative to the plurality of sensors, measuring the voltage outputs of the sensors relative to the position of the float to obtain calibration values, and storing the calibration values and the float position. After calibrating, the float and the plurality of sensors are positioned in the liquid to be measured, and the voltage outputs of any sensors activated by the presence of the magnetic means in the float are measured to provide measurement values. The method then compares the measurement values with the stored calibration values, thereby determining the float position and so the liquid level.

Still a further object is to provide such a method which includes calibrating and measuring the voltage of outputs of at least two sensors while the float is at one position. The method also includes calibrating by measuring the voltage outputs of the sensors relative to the position of the float at a greater number of positions than the number of sensors.

Other and further objects, features and advantages will be apparent from the following description of a presently preferred embodiment of the invention, given for the purpose of disclosure and taken in conjunction with the accompanying drawings.

BRIEF DESCRIPTION OF THE DRAWINGS

FIG. 4 is an electrical block diagram of the processor of the present invention, FIG. 5 is a block diagram of the sensor probe of the present invention, FIGS. 6 and 7 are logic flow diagrams of the calibration routine of the present invention, FIG. 11 is a logic flow diagram of the calculate routine of the present invention.

DESCRIPTION OF THE PREFERRED EMBODIMENT

Figure 1:
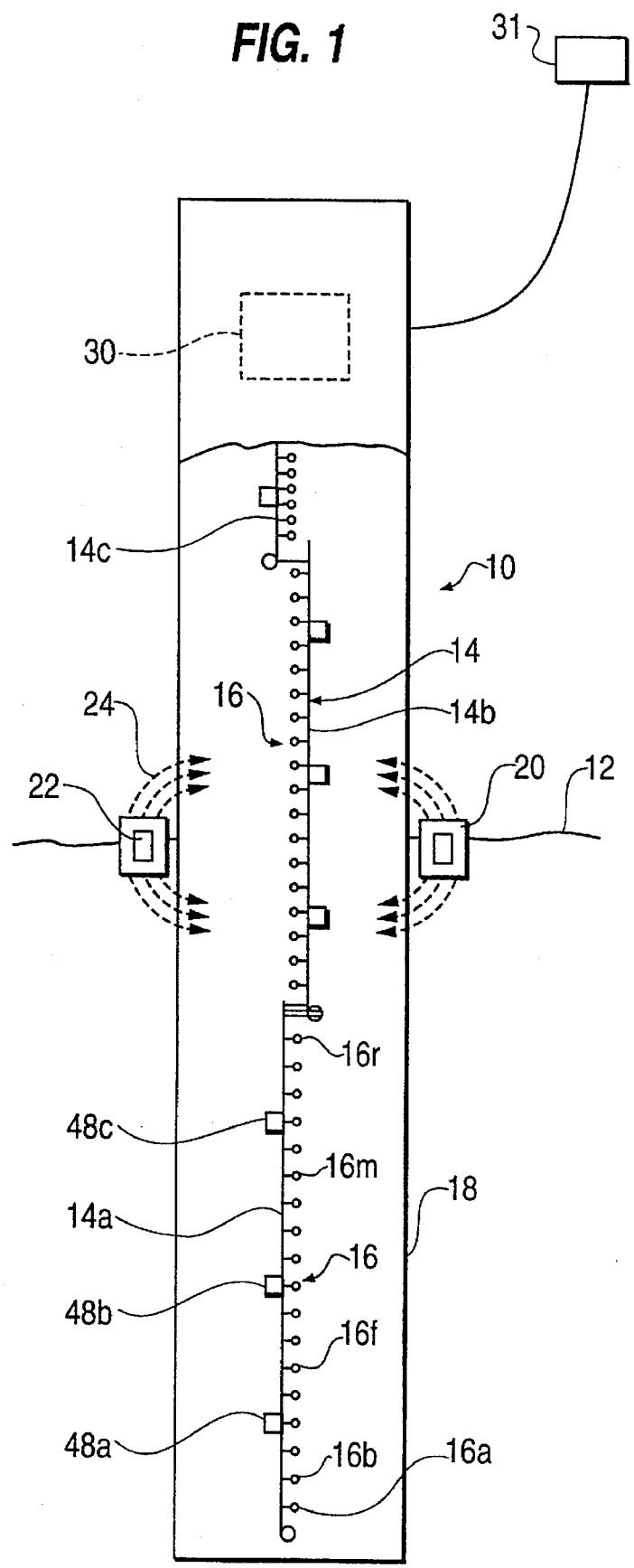
FIG. 1 is an elevational view, partly in cross section, and partly schematic, illustrating a liquid level measuring apparatus of the present invention.

Referring now to the drawings, and in particular to FIG. 1, the reference numeral 10 generally indicates the apparatus of the present invention which is adapted to be inserted into a liquid container for measuring the liquid level of a liquid, such as liquid level 12. The liquid level measuring apparatus includes a support 14, such as a printed circuit board, on which are positioned a plurality of spaced analog output voltage Hall-effect sensors 16, including individual sensors 16a et al. A non-magnetic enclosure 18, such as stainless steel or plastic, surrounds and protects the circuit board 14 and sensors 16 from the surrounding liquid. One or more float means are positioned movably coaxially around the enclosure 18 and carry magnetic means, such as a plurality of permanent magnets, for measuring one or more liquid levels. Thus, for measuring liquid level 12, a float 20 moves vertically with the liquid level 12, carrying magnets 22 which provide a magnetic field 24, all of which move relative to the sensors 16.

Figure 2:
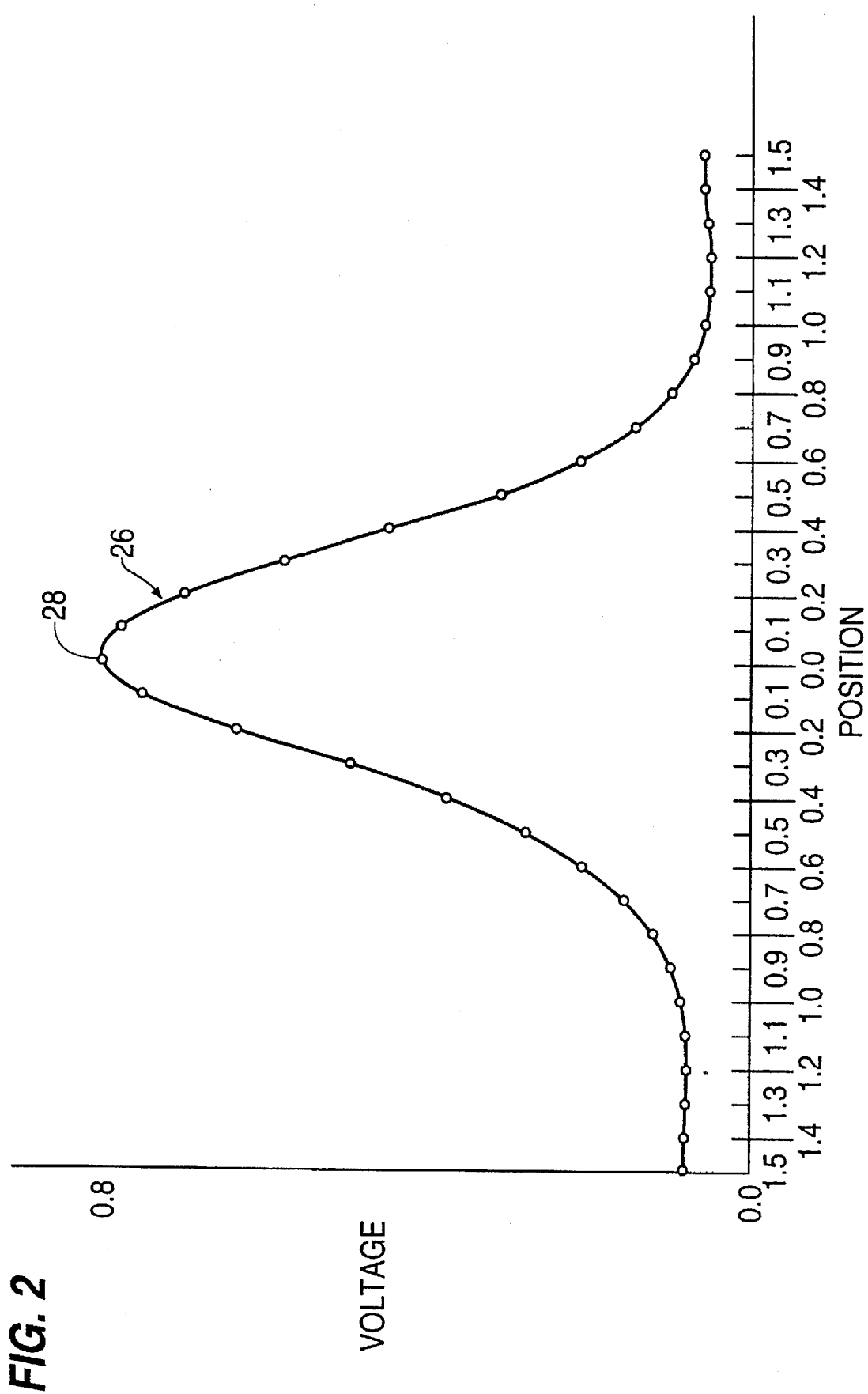
FIG. 2 is a graph illustrating the voltage output of a sensor in an apparatus of the present invention relative to the position of the magnetic float.

Referring now to FIG. 2, a graph is shown of the output voltage of an analog output voltage Hall-effect sensor, such as Model No. UGN 3503, sold by Allegro Microsystems, Inc., in which the vertical axis represents the sensor output voltage and the horizontal axis represents the position of the float 20 and its magnetic means 22, shown in the representative example of FIG. 2 in terms of tenths of an inch from the sensor. Such a Hall-effect sensor is generally known as a linear Hall-effect sensor, which differs from digital Hall-effect sensors disclosed in U.S. Pat. No. 4,361,835 and 4,589,282. That is, the digital sensor has an off-on output, while the linear type sensor 16 has an output voltage proportional to the magnetic field to which it is subjected. However, it is noted that some portions of the graph 26 are non-linear, and it is also a fact that the voltage output characteristics of different sensors 16 vary from one sensor to another.

There are several methods of using the voltage output of a sensor 16, as shown in the graph 26, to determine the position of the float 20 and thus of the liquid level 12. The methods differ depending upon the desired accuracy. One method is merely to measure and record the maximum voltage output 28 on the graph 26 for each of the sensors 16 and to store each measured value which is an indication of one position of the float 20. With the stored maximum values 28 of each sensor 16 recorded in a look-up table, the position of the float 20 can be ascertained with reference to each sensor 16 as the float sequentially moves upwardly or downwardly on the apparatus 10. Of course, the accuracy then would be determined by the vertical spacing of the sensors 16.

Another method is by determining the graph 26 for each of the sensors 16 by moving the float 20 relative to each of the sensors 16, and measuring the voltage output of each sensor relative to each position of the float to obtain for each sensor the multitude of values illustrated in FIG. 2. The values of the measured voltage outputs versus the float position would then be stored in a lookup table. After calibrating and in use, the voltage output of any sensor activated by the presence of the float 20 would be measured, and the measured voltage output would be compared with the stored values for that particular sensor 16, thereby determining the liquid level. This method, of course, provides an accuracy much greater than the mere distances between adjacent sensor 16.

Figure 3:
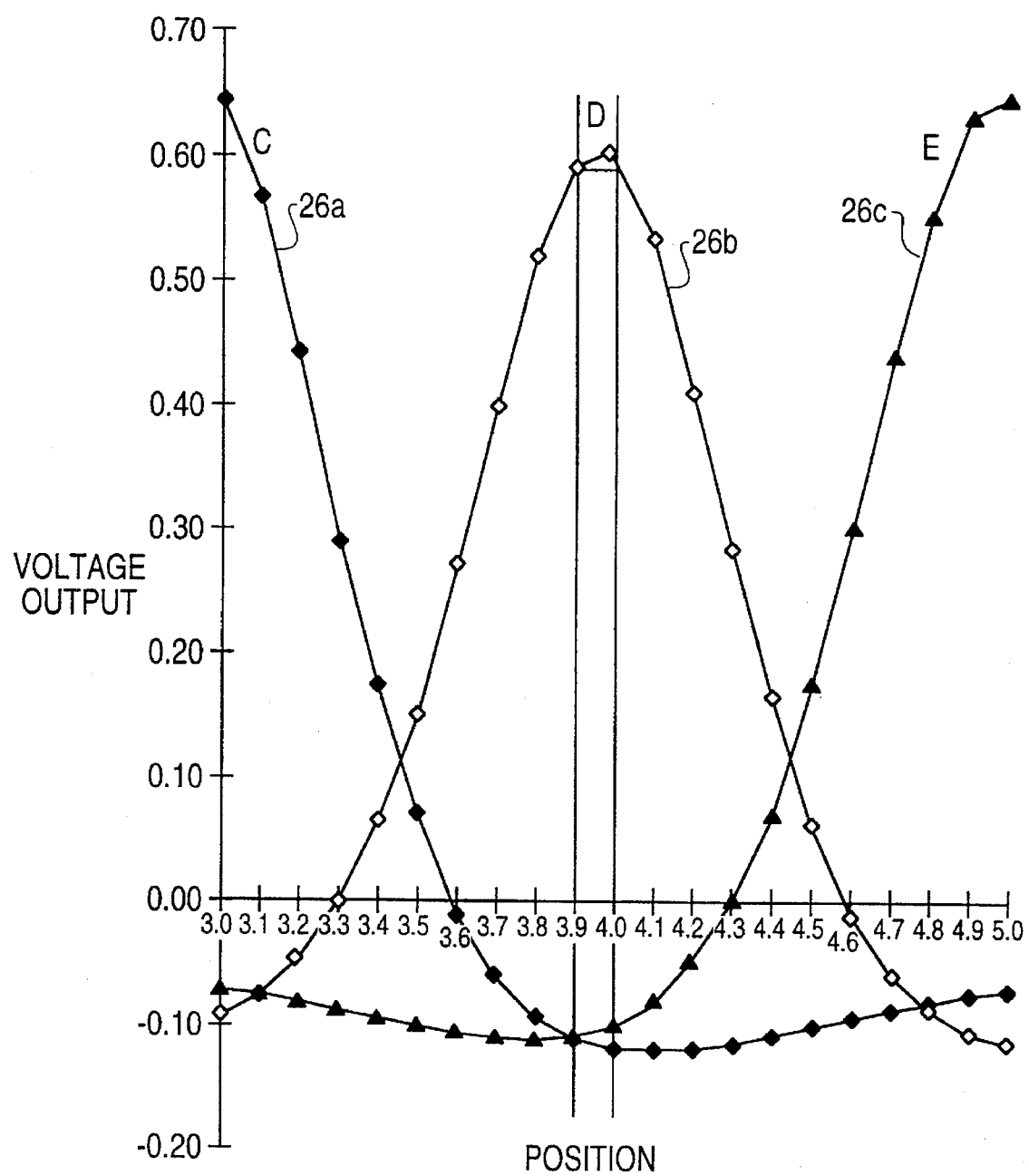
FIG. 3 is a graph of the analog output voltages of a plurality of sensors in an apparatus of the present invention relative to the magnetic float.

Referring now to FIG. 3, a plurality of graphs 26a, 26b, and 26c are shown of a plurality of voltage outputs of analog Hall-effect sensors 16a, 16b and 16c (FIG. 1) relative to the position of the float 20. Again, the graphs 26a et al. are obtained by calibration of the float and the various sensors 16 by measuring the voltage outputs of the sensors relative to the position of the float 20 when moving the float 20 relative to the sensors. It is to be noted in FIGS. 1 and 3 that the magnetic means 22 of the float 20 activates more than one sensor 16 at any one float position, thereby providing a greater number of readouts and providing greater accuracy. For example, it is to be noted that the voltage output of sensor 16b shown in graph 26b is the same at both float position 3.9 and float position 4.0. The actual position of float 20, and thus the fluid level are determined by referring to the voltage outputs of sensors 16a and 16c, as shown in graphs 26a and 26c. If the voltage outputs of 16a and 16c are the same, then the float position is 3.9. If the voltage output of sensor 16c is more positive (less negative) than the voltage output of sensor 16a, then the float position is 4.0.

Referring now to FIGS. 1, 4 and 5, one apparatus for measuring the liquid level is shown for purposes of illustration only and as an example, in which the support 14 includes three eighteen-inch sections 14a, 14b, and 14c, each having eighteen sensors 16 positioned in groups of six. The sensors 16, as illustrated, are spaced one inch apart and are all positioned on the centerline of the apparatus 10. A processor 30 (FIGS. 1 and 4) is connected to the printed circuit board 14. FIG. 5 illustrates a single sensor section 14a having eighteen sensors 16a–16r connected in three groups of six. Additionally, similar sensor sections 14b and 14c are connected to section 14a.

The processor unit 30 (FIG. 4) includes a clock 32, a CPU 34, a connector 36 for connection to support 14, a ROM 38 having the logic program, a RAM 40 providing a lookup table, and a power supply 42, including a voltage source and a voltage regulator which provides voltage for processor 30 and the Hall-effect sensor sections 14. The Hall-effect sensor section 14a (FIG. 5) includes a connector 45 connectable to connector 36 of processor 30, three groups of six sensors (sensors 16a–16f, 16g–16l, and 16m–16r), each group controlled by a separate shift register 46a, 46b, 46c, a temperature sensor 50a, 50b and 50c for each respective group of six sensors 16, and a connector 36' permitting connection to the next sensor probe section 14b.

The CPU 34 measures the voltage level output of each Hall-effect sensor 16 through the processor's 10 bit successive approximation analog to digital converter to determine whether a magnetic field is present, and determines the position of the float 20 relative to the measured Hall-effect sensor 16, so as to determine the liquid level by referring to stored calibration values in a lookup table in RAM 40 in response to a logic program stored in ROM 38. The CPU 34 has eight channels and uses six channels to measure voltage levels from each group of six sensors 16 and one channel to measure the temperature for voltage/temperature compensation of all the analog devices. To start a measurement the CPU 34 generates a reset signal to all of the shift registers 46 to turn off all the sensors 16. The data line to the first shift register 46a (FIG. 5) is held high while the clock is then cycled to measure the output of each of the six sensors 14a–14f connected to that shift register. The data line for shift register 46a is turned off and not energized again until the voltage levels on all sensors down the full length of the probe 10 have been measured by the processor 30.

The remaining channel of CPU 34 enables measurement of a voltage level indicative of the six-sensor group of the measuring element 10 that has its shift register 46 activated. This first channel applies voltage through a transistor switch 48a to a resistor network 52, 54, 56, and the resulting voltage is converted by CPU 34 to a position indication identifying which group of six sensors 16a–16f, 16g–16l, or 16m–16r is providing the voltage.

Referring now to FIGS. 6 and 7, the logic flow diagram is shown for calibrating the apparatus 10. The calibrate routine shown is used to generate data for a lookup table of the analog Hall-effect output voltages which is stored in RAM 40. As previously indicated, the method of the present invention can be utilized in a Course Mode where the highest output voltage measured as the float 20 passes over each sensor 16 is recorded and an alternate minimum voltage is measured on the sensors with no flux present. Another mode of calibration is the Fine Resolution Mode to generate the lookup tables. Referring to FIG. 6, in step 100, all of the shift registers 46 are cleared, and the timer interrupts are disabled. In step 102, the probe 14 is set up for this calibration by turning on the first three Hall sensors 16 and three more sensors near the mid-point of the probe 14. In step 104 a determination is made of whether the mode of operation is the Course Mode or the Fine Resolution mode. In the Course Mode, step 106 consists of recording the maximum outputs of the Hall-effect sensors 16 as the float 20 moves over the probe enclosure 18. In step 108, a record is made of the minimum outputs of the Hall sensors. In step 110, the data is shifted along the probe to turn on the next set of six Hall-effect sensors. In step 112, the loop is recycled until all of the Hall-effect sensors have been calibrated and have had their values recorded in the RAM 40. Step 114 is to go the Run Routine.

Back in step 104, if the accuracy is to be Fine Resolution instead of Course, then the next step 116 is to go to the Fine Resolution Mode shown in FIG. 7. The Fine Resolution Mode generates a Hall-effect sensor output voltage table by sampling each sensor several times, once for each of a set of calibration pulses. In step 118, a determination is made of whether a pulse input is received or not. If yes, then step 120 records the output of the Hall-effect sensor in the lookup table in RAM 40. In step 122, multiple samples of each Hall-effect sensor output are taken at pulse increments. In step 124 the data pattern is shifted down to turn on the next Hall-effect sensor and to turn off the previous Hall-effect sensor, and in step 126 a determination is made of whether the end of the probe 10 has been reached. When all of the Hall sensors 16 have been calibrated, step 128 goes to the Run Routine.

Figure 8:
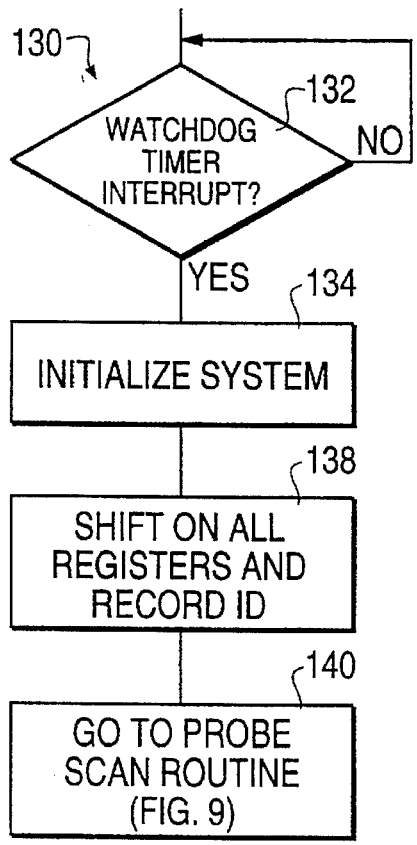
FIG. 8 is a logic flow diagram of the power on routine of the present invention.

Referring now to FIG. 8, the logic flow diagram for the Power On routine 130 is shown. This routine is performed when the processor 30 is first turned on, or if the watchdog timer times out as a result of a program interruption. The power on routine 130 includes a timer interrupt 132 which interrupts and resets the watchdog timer, for example every half-second. Step 134 initializes the system, including the communication channel, the memory, the timer and clocks. Step 138 shifts a 1 (on state) down through all the shift registers 46 and records the number of probe sections read until no signal is returned. This determines the total probe length. Step 140 is to go the Probe Scan Routine.

Figure 9:
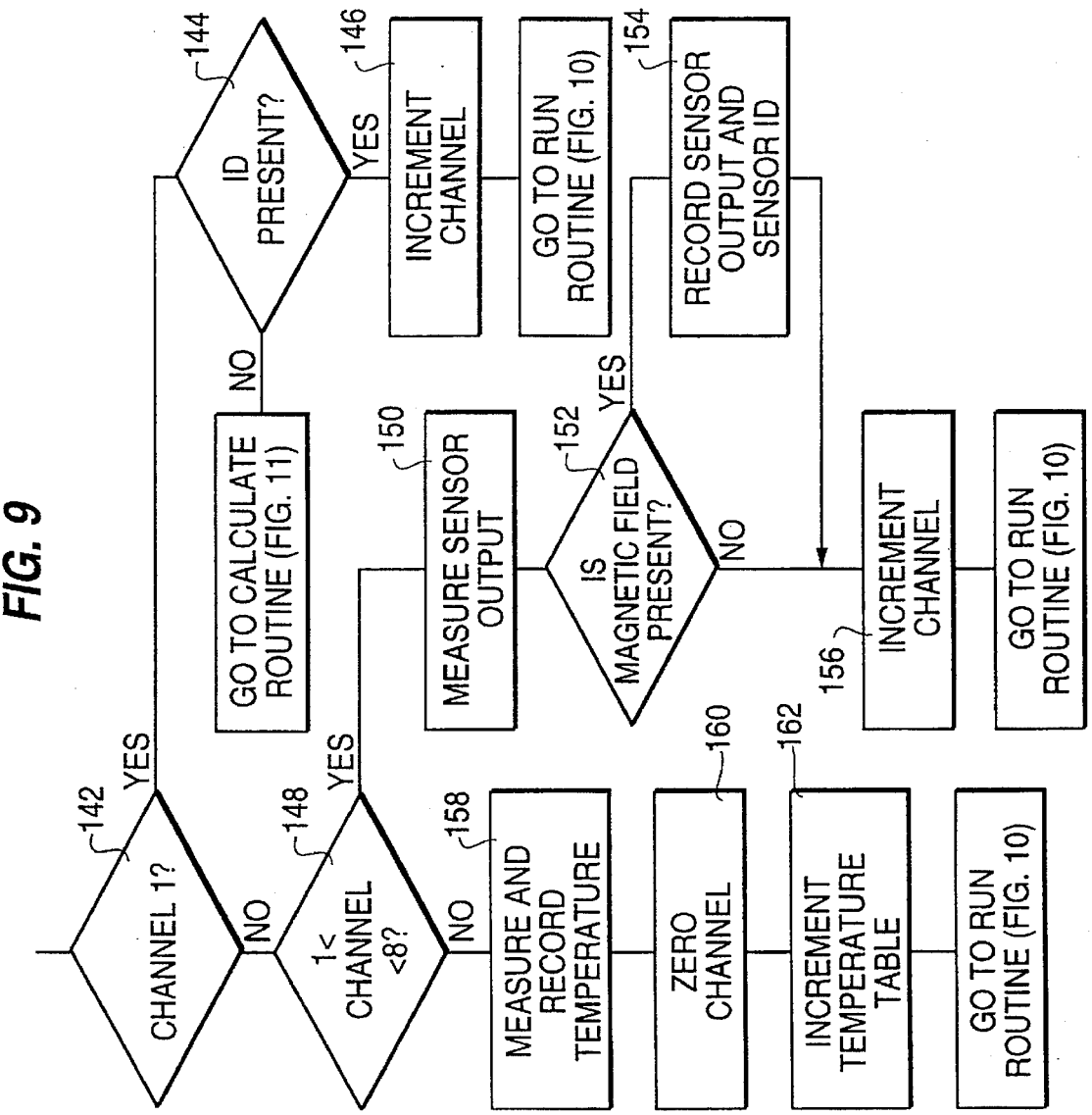
FIG. 9 is a logic flow diagram of the probe scan routine of the present invention.

Referring now to FIG. 9, the logic flow diagram of the Probe Scan Routine is shown. Step 142 determines whether the analog to digital channel register is on channel 1. If so, the an ID measurement is sought from resistor 52, 54, 56 (FIG. 5), as indicated in step 144. In step 146, if an ID value is read, then it is saved as the indication of the current six-sensor group, and the Run Routine is entered. If no ID is present at step 144, then the end of the probe has been reached, and the program goes to the Calculate Routine, as will be more fully discussed. In step 142, if the channel register is not on channel 1, then in step 148 if the register is on one of the channels 2–7, then the analog measurement is the output of a Hall-effect sensor. If an output is measured, then the float 20 is near. In step 150, the Hall sensor output is measured. As indicated in step 152, if the measured voltage indicates that a magnetic field is present, then in step 154 the output and current ID are recorded in a level table in the RAM 40 and in step 156 the channel is incremented, and the Run Routine is then entered. In step 152 if no magnetic field is indicated, the channel is incremented in step 156, and the process returns to the Run Routine. In step 148, if channel 8 is being measured, then in step 158 a temperature measurement is made and recorded, in step 160 the channel is zeroed, in step 162 the temperature table position register is incremented, and the Run Routine is entered.

Figure 10:
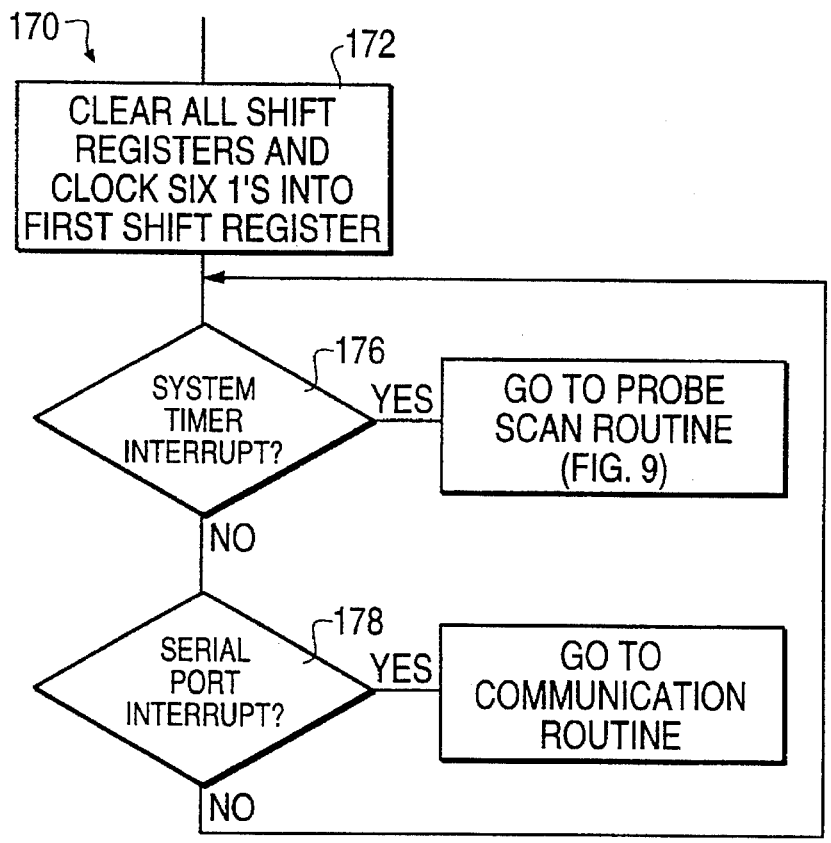
FIG. 10 is a logic flow diagram of the run routine of the present invention.

Referring now to FIG. 10, the Run Routine 170 is shown. The Run Routine 170 is executed after the Power On Routine 130 and after the Probe Scan Routine 140, following a scan of the total length of the probe 14. In step 172, a reset signal clears the shift registers 46 and clocks six 1's into the first shift register 46a to turn on the first six sensors 16a–16f. In step 176 if the timer is interrupted, the process goes to the probe scan routine. Otherwise, in step 178, if the serial port is interrupted, the process goes to a Communication Routine to communicate float position information to utilizing device 31 (FIG. 1).

In FIG. 11, the Calculate Routine 180 is shown. In step 182 the recorded voltage outputs are read until the sensor with the highest output is found. Step 186 determines whether the mode of calculation is the Course Mode or the Fine Resolution Mode. If the Course Mode is used, step 188 determines the float's position by the process described above with reference to FIG. 2. If the Fine Resolution Mode is used, step 190 scans the calibration look-up table in the RAM 40 for the particular Hall sensor being read, and step 192 determines the float's position by the process described above with reference to FIG. 3. From this and the total probe length, the liquid level can be determined.

The present invention, therefore, is well adapted to carry out the objects and attain the ends and advantages mentioned as well as others inherent therein. While a presently preferred embodiment of the invention has been given for the purpose of disclosure, numerous changes in the details of construction, arrangement of parts, and steps of the process may be made without departing from the spirit of the invention, and the scope of the appended claims.

We claim:

1. A liquid level measuring apparatus comprising:

a plurality of spaced analog output voltage Hall-effect sensors, said sensors having different voltage output characteristics and being vertically aligned for positioning in a liquid, a float, carrying magnetic means, movably positioned adjacent said plurality of sensors, storage means for storing values of the voltage output of each of said sensors relative to the position of said magnetic means, processing means for determining the liquid level, said processing means comprising:

measuring means connected to each of said sensors for measuring the voltage output of each sensor, to detect sensors activated by said magnetic means, and calculating means for determining the location of said float as a measurement of the liquid level by comparing the voltage output measured by said measuring means and the values stored in said storage means.

2. The apparatus of claim 1, wherein said measuring means measures the voltage output of at least two of said sensors while said float is at one position.

3. The apparatus of claim 1, wherein the stored values are more numerous than the number of sensors, for providing greater accuracy.

4. The apparatus of claim 1, further comprising temperature measuring means for measuring the temperature adjacent said sensors for use in compensating the output voltage of said sensors for temperature variations.

5. The apparatus of claim 1, wherein said measuring means includes means for sequentially measuring the voltage outputs of a group of said sensors at one time, thereby reducing electrical current requirements.

6. A method of measuring liquid level with a float carrying magnetic means movably positioned adjacent a plurality of spaced analog output voltage Hall-effect sensors positioned in a liquid in which the sensors have different voltage output characteristics, said method comprising:

(a) calibrating the float and sensors by moving the float relative to the plurality of sensors while measuring the voltage outputs of the sensors relative to the position of the float to obtain calibration values, (b) storing the calibration values and the corresponding float positions, (c) positioning the float and the plurality of sensors in the liquid to be measured, (d) measuring the voltage outputs of any sensors activated by the presence of the magnetic means carried by the float to obtain measurement values, and (e) comparing the measurement values and the stored calibration values to determine the float position as a measurement of the liquid level.

7. The method of claim 6, wherein step (a) includes measuring the voltage outputs of at least two sensors while the float is at one position.

8. The method of claim 6, wherein step (a) includes measuring the voltage outputs of the sensors at a number of float positions greater than the number of sensors.

9. The method of claim 6, further comprising measuring the temperature adjacent the sensors for use in compensating the voltage outputs for temperature variations.

10. The method of claim 6, wherein step (a) comprises sequentially measuring the voltage outputs of groups of sensors at one time, thereby reducing electrical current requirements.

* * * * *